United States Patent
Peel et al.

(10) Patent No.: US 11,300,856 B2
(45) Date of Patent: Apr. 12, 2022

(54) CAMERA MOUNT SYSTEM

(71) Applicant: Tactacam LLC, Caledonia, MN (US)

(72) Inventors: Jeff Peel, Decorah, IA (US); Benjamin Stern, Holmen, WI (US); Ben Thorud, Holmen, WI (US)

(73) Assignee: TACTACAM LLC, Caledonia, MN (US)

(*) Notice: Subject to any disclaimer, the term of this patent is extended or adjusted under 35 U.S.C. 154(b) by 4 days.

(21) Appl. No.: 16/203,957

(22) Filed: Nov. 29, 2018

(65) Prior Publication Data

US 2019/0163038 A1   May 30, 2019

Related U.S. Application Data

(60) Provisional application No. 62/592,017, filed on Nov. 29, 2017.

(51) Int. Cl.
| | |
|---|---|
| *G03B 17/56* | (2021.01) |
| *H04N 5/232* | (2006.01) |
| *F16M 11/00* | (2006.01) |
| *G06T 7/70* | (2017.01) |
| *G01S 3/00* | (2006.01) |

(52) U.S. Cl.
CPC .......... *G03B 17/561* (2013.01); *F16M 11/00* (2013.01); *G01S 3/00* (2013.01); *G03B 17/563* (2013.01); *G06T 7/70* (2017.01); *H04N 5/232* (2013.01); *H04N 5/23299* (2018.08); *F16M 2200/041* (2013.01); *G03B 2205/0007* (2013.01)

(58) Field of Classification Search
CPC ........................... H04N 5/23299; G01S 3/786
See application file for complete search history.

(56) References Cited

U.S. PATENT DOCUMENTS

| | | | | |
|---|---|---|---|---|
| 5,967,458 A | * | 10/1999 | Williams | .............. F41G 7/2213 244/3.16 |
| 2011/0228098 A1 | * | 9/2011 | Lamb | ..................... G01S 17/023 348/164 |
| 2012/0194644 A1 | | 8/2012 | Newcombe | |
| 2013/0120586 A1 | * | 5/2013 | Takashima | ............. H04N 5/225 348/169 |
| 2013/0336628 A1 | * | 12/2013 | Lamb | ...................... H04N 9/79 386/224 |
| 2014/0098241 A1 | | 4/2014 | Stout | |

(Continued)

OTHER PUBLICATIONS

PCT, Notification of Transmittal of the International Search Report and the Written Opinion of the International Searching Authority, or the Declaration, in International Application No. PCT/US18/62984, dated Feb. 8, 2019 (13 pages).

(Continued)

*Primary Examiner* — Noam Reisner
(74) *Attorney, Agent, or Firm* — McAndrews, Held & Malloy, Ltd.

(57) ABSTRACT

Systems, apparatuses, and methods are described which provide a camera mount system. A camera mount is in communication with a positioning device. The positioning device has a compass, gyroscope, and emits an infrared light beam. The camera mount has a sensor that receives reflected and/or scattered infrared light from a moving target. The camera mount changes its orientation based on information from its sensor, and gyroscope and compass information from the positioning device.

20 Claims, 4 Drawing Sheets

(56) References Cited

U.S. PATENT DOCUMENTS

2014/0217906 A1* 8/2014 Vo .................. H05B 37/0272
                                                    315/155
2015/0189175 A1   7/2015 Guangbin
2016/0248969 A1* 8/2016 Hurd ................ H04N 5/23216
2018/0313956 A1* 11/2018 Rzeszutek ............ G01S 17/86

OTHER PUBLICATIONS

PCT, Notification Concerning Transmittal of International Preliminary Report on Patentability, in International Application No. PCT/US18/62984, dated Jun. 11, 2020 (7 pages).

* cited by examiner

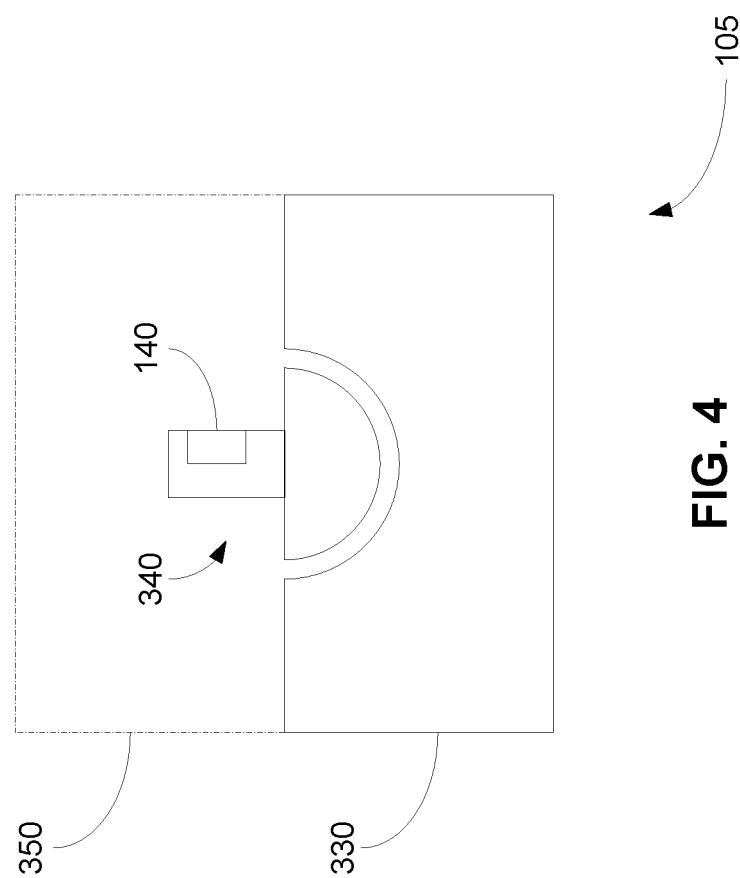

CAMERA MOUNT SYSTEM

CROSS-REFERENCE TO RELATED APPLICATIONS

The present application claims benefit from and priority to U.S. Application No. 62/592,017, filed Nov. 29, 2017. The above-identified application is hereby incorporated by reference herein in its entirety.

BACKGROUND

Conventional tripods provide a static platform on which a camera can be mounted. If the object of the picture moves off frame, the operator must manually re-position the mount. However, if the object is continuously moving out of the static frame, then the operator has little recourse.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems, apparatuses, and methods provide a camera mount system substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

FIG. 4 shows a camera mount according to an embodiment of the present disclosure.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure provide systems, apparatuses, and methods relating to camera mount systems.

Figure 1:
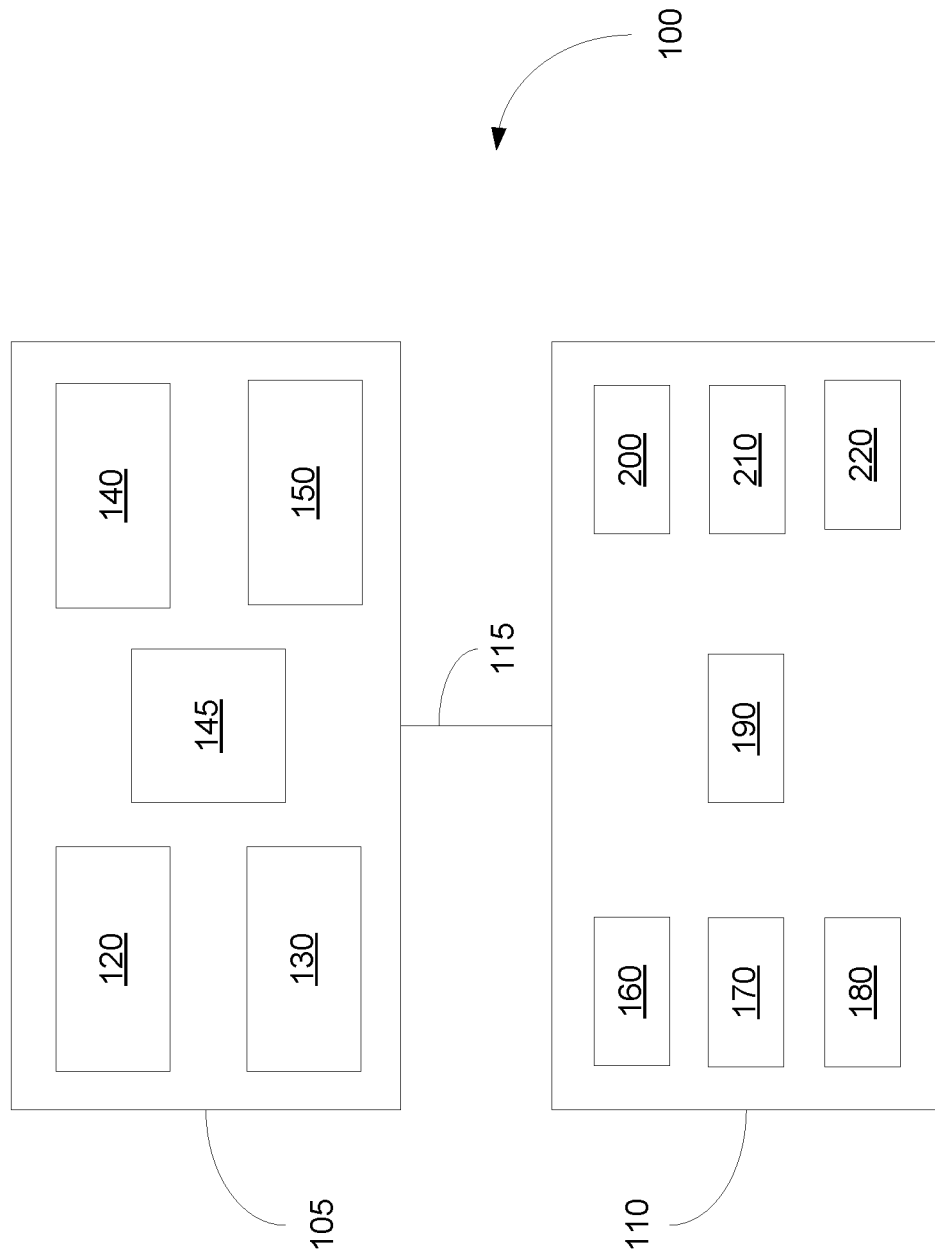
FIG. 1 shows an embodiment of a camera mount system according to the present disclosure.

FIG. 1 shows a block diagram of an embodiment of a camera mount system according to the present disclosure. Referring to FIG. 1, the camera mount system 100 includes a camera mount 105 and a positioning device 110. The camera mount 105 is configured to hold a camera (e.g., a recording device, a video recorder, an image recorder, etc.). The camera mount 105 and the camera (not shown) can be operatively coupled via a wireless or wired link. The camera mount 105 and the positioning device 110 can be operatively coupled via a communication link 115. The communication link 115 can be wired (e.g., cable, wire, etc.) and/or wireless (e.g., cellular, WiFi, Bluetooth, radio frequency (RF), local area network (LAN), personal area network (PAN), satellite, infrared, etc.). The communication link 115 can be one-way or two-way.

In some embodiments, the camera mount 105 can include, for example, a processor 120, a memory 130 (e.g., a non-transitory memory), a sensor 140 (e.g., an infrared sensor, an RF sensor, an electromagnetic sensor, a thermal sensor, a heat sensor, a heat source sensor, a motion detector, a target recognition sensor, etc.), a motor 145, and other input/output devices 150 (e.g., a display, a keyboard, a touch-sensitive screen, transceivers for wireless and/or wired communication, transmitters, receivers, communication devices, buttons, user interfaces, graphical user interfaces, input/output ports, input/output interfaces, etc.). These components or subsystems can be operatively coupled via, for example, one or more buses.

In some embodiments, the positioning device 110 can include, for example, a processor 160, a memory 170, a compass 180, a gyroscope 190 (e.g., a microelectromechanical system (MEMS) gyroscope), an infrared light emitter 200 (or other type of electromagnetic source such as a visible light emitter, a radio frequency emitter, a microwave emitter, etc.), a sensor 210 (e.g., an infrared sensor, an RF sensor, an electromagnetic sensor, a thermal sensor, a heat sensor, a heat source sensor, a motion detector, a target recognition sensor, etc.), and other input/output devices 220 (e.g., a display, a keyboard, a touch-sensitive screen, transceivers for wireless and/or wired communication, transmitters, receivers, communication devices, buttons, user interfaces, graphical user interfaces, etc.). These components or subsystems can be operatively coupled via, for example, one or more buses.

Figure 2:
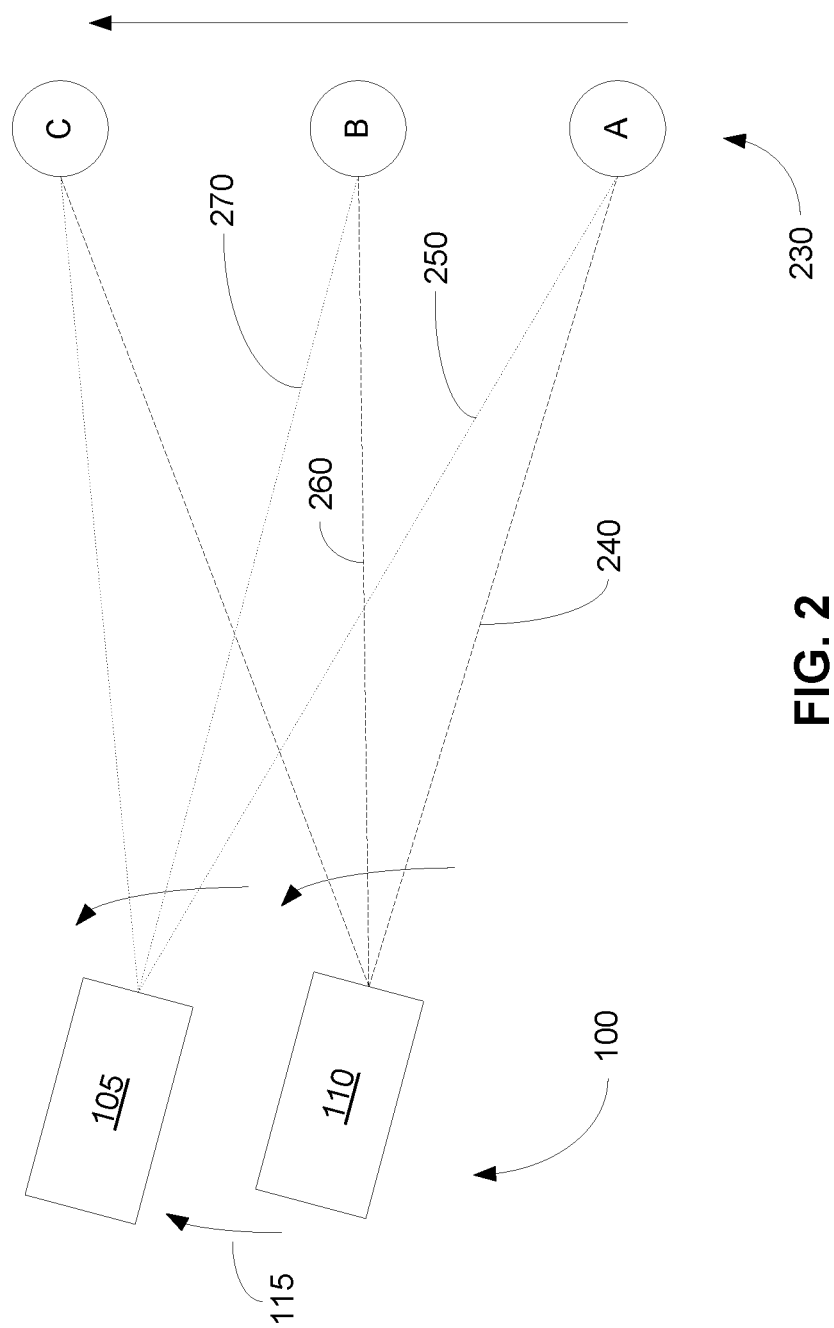
FIG. 2 shows the operation of the camera mount system according to an embodiment of the present disclosure.

FIG. 2 shows the camera mount system 100 in operation according to an embodiment of the present disclosure. Referring to FIG. 2, a target 230 (e.g., wildlife, object, person, vehicle, etc.) is moving (e.g., continuously moving, sporadically moving, etc.) from position A to position B and then from position B to position C.

Some embodiments provide that the positioning device 110 is pointed or aimed at the target 230 at position A and is caused (e.g., after actuating a trigger) to emit an infrared beam 240 (e.g., via the infrared light emitter 200). Some embodiments contemplate that the positioning device 110 has one or more lenses to focus the infrared beam 240. In some embodiments, the direction that the positioning device 110 is pointed or aimed at when the infrared beam 240 is triggered automatically causes the position of the mount to aim at and/or lock onto the target to start tracking (e.g., tracking automatically, semi-automatically, manually, etc.) the target 230. The infrared beam 240 is reflected or scattered off of the target 230 at position A, and the reflected or scattered infrared beam 250 is received by the sensor 140 of the camera mount 105. Some embodiments contemplate that one or more lenses (e.g., one or more lenses that are part of or attached to the camera mount 105) may be used to direct or guide infrared light to the sensor 140. The signal received by the processor 120 from the sensor 140 based on the received reflected or scattered infrared beam provides the camera mount 105 with information as to the location (e.g., distance and/or direction) of the target 230, and/or the speed and/or movement direction of the target 230. Several signals or a sampling of one or more signals over a period of time from the sensor 140 might be used to determine the speed and/or movement direction of the target 230. Based on the received reflected or scattered infrared beam signals, the processor 120 causes the motor 145 to move a camera platform that holds the camera so that the front of the camera platform (e.g., the front of the platform with the sensor 140), for example, faces (e.g., follows, tracks, etc.) the target 230.

In addition, some embodiments provide that the compass 180 and/or the gyroscope 190 of the positioning device 110 provide information about where the positioning device 110 is located and the direction that the positioning device 110 is pointed or aimed at, thereby providing additional information about the position of the target 230, and/or the speed and/or movement direction of the target 230. The information from the compass 180 and the gyroscope 190 can be sent to the camera mount 105 via the communication link 115 (e.g., a wireless and/or wired link).

Some embodiments provide that the compass-based information and/or gyroscope-based information received from the positioning device 110 can be used by the processor 120 of the camera mount 105 and/or the processor 160 of the positioning system 110 to position or refine the position (e.g., location, direction, etc.) of the camera platform that holds the camera so that the front of the platform, for example, faces the target 230.

Some embodiments provide that the compass-based information and/or gyroscope-based information can be used by the camera mount 105 to position the camera platform even if the target 230 is missed by the infrared beam emitted by the positioning device 110.

Some embodiments provide that the processor 120 of the camera mount 105 and/or the processor 160 of the positioning system 110 can compare the information received from the sensor 140 and/or sensor 210 and the information provided by the positioning device 110. Based on the comparison and possibly recent historical information stored in the camera mount 105, the processor 102 and/or processor 160 can select and/or weight information received from the sensor 140 over information received from the positioning device 110, or vice versa. Some embodiments provide that, based on the comparison, the camera mount 105 can adjust or refine the position of the camera platform so that the camera platform more precisely or accurately tracks or follows the target 230.

Some embodiments provide that the processor 120 of the camera mount 105 and/or the processor 160 of the positioning system 110 causes the camera platform to track or follow the target 230 based on any combination of the received reflected or scattered infrared beam from the target 230, compass-based information from the positioning device 110, and/or gyroscope-based information from the positioning device 110.

Some embodiments provide that the processor 120 of the camera mount 150 and/or the processor 160 of the positioning system 110 can automatically or semi-automatically track the target 230 via target recognition (e.g., pattern recognition, contrast differences, facial recognition, etc.). The target recognition can be facilitated by camera software and/or a device external to the camera (e.g., the camera mount 105, a device in communication with the camera mount 105 and/or the camera, etc.). Some embodiments provide that the processor 120 of the camera mount 150 and/or the processor 160 of the positioning system 110 can automatically or semi-automatically track the target 230 via thermal imaging (e.g., infrared imaging, heat imaging, etc.). Thus, the camera mount 150 and/or the camera can track a moving target in light or dark conditions.

Some embodiments provide that the processor 120 of the camera mount 105 and/or the processor 160 of the positioning system 110 can store, in memory 130 and/or memory 170, information received visually via its sensor 140 and digital compass-based information and/or gyroscope-based information from the positioning device 110 from various target locations. The historical information (e.g., recent historical information) can be used to smooth out (e.g., statistically smooth out, algorithmically smooth out, etc.) information being received, for example, from an unsteady hand wielding the positioning device 110. The historical information can also provide a basis from which other target locations can be relatively located.

When the target 230 reaches position B, the positioning device 110 is aimed or pointed at the target 230 at position B and caused to emit or continue to emit an infrared beam 260 at the target 230 at position B. Some embodiments provide that the positioning device 110 can be triggered to emit the infrared beam 260 at the target at position B. The infrared beam 260 is reflected or scattered off of the target 230 at position B, and the reflected or scattered infrared beam 270 is received by the sensor 140 of the camera mount 105. The signal received by the processor 120 from the sensor 140 based on the received reflected or scattered infrared beam provides the camera mount 105 with information as to the location (e.g., distance and/or direction) of the target 230, and/or the speed and/or movement direction of the target 230. Based on the received reflected or scattered infrared beam signals, the processor 120 causes the motor 145 to move the camera platform that holds the camera so that the front of the camera platform (e.g., the front of the platform with the sensor 140), for example, faces (e.g., follows, tracks, etc.) the target 230.

Some embodiments provide that the infrared beam is emitted continuously or periodically, for example, when a button is held down on the positioning device 110. Thus, with the button held down, the positioning device 110 can be fluidly aimed at the target 230 as it moves from position A to position B, for example. The camera mount 105 correspondingly causes the camera platform with the sensor 140 to fluidly follow or track the target 230.

Some embodiments provide that the positioning device 110 has its own sensor 210. Accordingly, the positioning device 120 can emit the infrared beam from its infrared light emitter 200, and can receive the reflected or scattered infrared beam via its sensor 210 along substantially the same beam path (e.g., back and forth along path 240 in FIG. 2). Thus, the positioning device 110 uses this visual data from its sensor 210 to determine the location (e.g., distance and/or direction) of the target 230, and/or the speed and/or movement direction of the target 230. This information can be sent to the camera mount 105 via the communication link 115.

Figure 3:
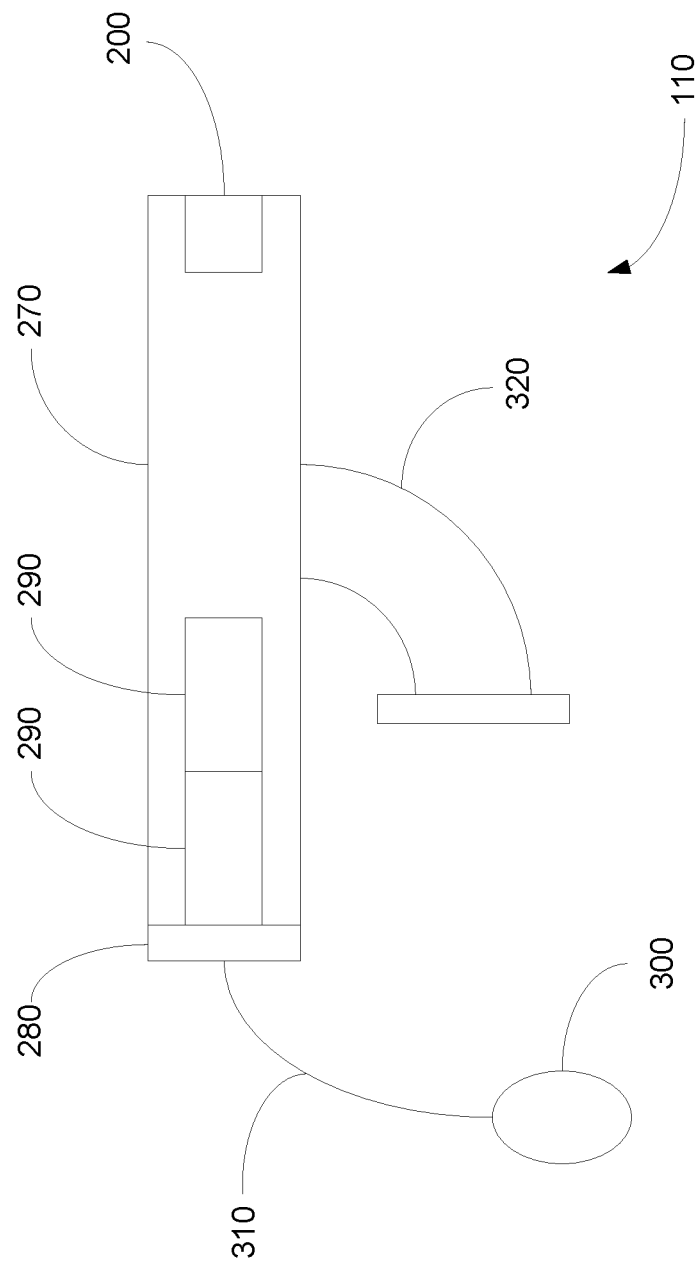
FIG. 3 shows a positioning device according to an embodiment of the present disclosure.

FIG. 3 shows an embodiment of the positioning device 110 according to the present disclosure. The positioning device 110 is shown with a housing 270 that houses the infrared light emitter 200. A cap 280 disposed at an end portion of the housing 270 closes a battery compartment that includes one or more batteries 290. The positioning device 110 is illustrated with a trigger 300 to activate the infrared light emitter 200 according to an embodiment of the present disclosure. The trigger 300 can have an attachment mechanism such as, for example, an adhesive backing so that it can stick to a surface. Although the trigger 300 is shown as connected to the rest of the positioning device 110 via a cord 310, some embodiments contemplate that the trigger 300 communicate with the rest of the positioning device 110 via a wireless communication link. The illustrated embodiment of the positioning device 110 also includes a mounting bracket 320 so that the positioning device 110 can be mounted on a weapon (e.g., a gun, a rifle, a bow, a crossbow, etc.), any object, a vehicle, a platform, a surface, etc. Different types of mounting brackets can be structured or designed for different applications.

FIG. 4 shows an embodiment of the camera mount 105 according to the present disclosure. The camera mount 150 is shown with a housing 330. A moveable camera platform 340 is shown with the sensor 140 on a front face of the camera platform 340. The camera platform 340 is structured so that the motor 145 can rotate the camera platform 340 approximately 360 degrees in a horizontal plane and rotate approximately 330 degrees in a vertical plane. The camera platform 340 is configured to receive a camera (not shown).

Some embodiments provide that the camera is held in place by the camera platform 340 and the camera platform 340 is rotated to change the direction of the camera. Some embodiments provide that the camera and the camera platform 340 are also electrically connected and in communication. For example, the camera can use the received distance information and/or direction and/or movement information of the target 230 to set up or configure its field of view, zoom, focus, etc.

Some embodiments provide that the camera mount 105 includes a transparent portion 350 of the housing 330 to protect the camera and portions of the camera mount 105 from the elements (e.g., environmental elements) without substantially affecting the ability of the camera to record images or the sensor 140 to sense infrared light.

Some embodiments provide that one or both of the camera mount 105 and the positioning device 110 are equipped with a satellite-based positioning system (e.g., global positioning system (GPS)) or some other location-determining system (e.g., a terrestrial location-determining system) to provide location information of the camera mount 105 and/or the positioning device 110.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A system, comprising:
 a camera mount that includes a sensor, wherein the camera mount is configured to change an orientation of a camera mounted to the camera mount such that the camera follows a moving target based on a signal received from the sensor;
 a positioning device that is not part of the camera mount, but is in communication with the camera mount, wherein the positioning device comprises a light emitter configured to be aimed at and follow the moving target and to emit a light in an aimed direction such that the light is reflected or scattered by the target and received by the sensor in the camera mount; and
 a processor in the camera mount or the positioning device that causes the camera mount to adjust its orientation based on a comparison of information received from the sensor and information from the positioning device.

2. The system according to claim 1, wherein the sensor includes an infrared sensor configured to detect the light reflected or scattered by the target.

3. The system according to claim 1, wherein the camera mount is configured to receive, via the sensor, infrared light that is reflected or scattered by the target.

4. The system according to claim 1, wherein the positioning device is operable to manually track the moving target via directing the emitted light at the target, which causes the camera mount to subsequently and automatically track the moving target based on the reflected or scattered light emitted by the positioning device that is reflected or scattered by the moving target and received by the camera mount.

5. The system according to claim 4, wherein the positioning device is structured to move independently of the camera mount.

6. The system according to claim 1, wherein the light includes an infrared light.

7. The system according to claim 1, wherein the positioning device is configured to receive the light that is reflected or scattered by the target and determine a position of the target.

8. The system according to claim 7, wherein the positioning device is configured to send target position information to the camera mount.

9. The system according to claim 8, wherein the camera mount is configured to use the target position information from the positioning device to change the orientation of the camera mount.

10. The system according to claim 1, wherein:
 the light emitter comprises an infrared light emitter;
 the light emitted by the light emitter comprises infrared light; and
 the positioning device is configured to receive infrared light from the light that is reflected or scattered by the target and determine, based on the received infrared light, one or both of a movement direction and a speed of the target.

11. The system according to claim 10, wherein:
 the positioning device is configured to send one or both of target movement direction information and target speed information to the camera mount; and
 the camera mount is configured to use one or both of the target movement direction information and the target speed information from the positioning device to change the orientation of the camera mount.

12. The system according to claim 1, wherein the camera mount is configured to receive the light that is reflected or scattered by the target and determine a position of the target, and wherein the camera mount is configured to change the orientation of the camera mount based on the determined position of the target.

13. The system according to claim 1, wherein:
 the light emitter comprises an infrared light emitter;
 the light emitted by the light emitter comprises infrared light;
 the camera mount is configured to receive infrared light of the light that is reflected or scattered by the target and determine, based on the received infrared light, one or both of a movement direction and a speed of the target; and the camera mount is configured to change the orientation of the camera mount based on one or both of a determined target movement direction and a determined target speed.

14. The system according to claim 1, wherein the positioning device is configured to be mounted on a weapon.

15. The system according to claim 1, wherein the positioning device is configured to be operated as a handheld device, and wherein the positioning device comprises one or more lenses, one or more processors, and one or more displays.

16. The system according to claim 1, wherein:

the positioning device includes a gyroscope and a compass, and the positioning device is configured to send information based on signals from the gyroscope and the compass to the camera mount.

17. The system according to claim 16, wherein the camera mount is configured to change the orientation of the camera mount based on the information from the gyroscope and the compass of the positioning device.

18. The system according to claim 1, further comprising the camera mounted the camera mount.

19. The system according to claim 1, wherein:

the positioning device further comprises a trigger; and the light emitter is further configured to continuously emit the light while the trigger is held in an activated position.

20. The system according to claim 1, wherein:

the positioning device further comprises a trigger; and the light emitter is further configured to periodically emit the light while the trigger is held in an activated position.

* * * * *